United States Patent
Yu et al.

(10) Patent No.: US 12,308,791 B2
(45) Date of Patent: May 20, 2025

(54) PHOTOVOLTAIC POWER GENERATION SYSTEM, POWER CONTROL METHOD, AND COMBINER BOX

(71) Applicant: HUAWEI DIGITAL POWER TECHNOLOGIES CO., LTD., Shenzhen (CN)

(72) Inventors: Xinyu Yu, Shanghai (CN); Kai Xin, Shanghai (CN); Peng Dong, Shanghai (CN); Yongbing Gao, Shanghai (CN); Yanzhong Zhang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 13 days.

(21) Appl. No.: 18/338,770

(22) Filed: Jun. 21, 2023

(65) Prior Publication Data
US 2023/0336119 A1   Oct. 19, 2023

Related U.S. Application Data

(63) Continuation of application No. PCT/CN2020/138170, filed on Dec. 22, 2020.

(51) Int. Cl.
*H02S 40/32* (2014.01)
*H02J 3/38* (2006.01)
*H02S 40/34* (2014.01)

(52) U.S. Cl.
CPC ............ *H02S 40/32* (2014.12); *H02J 3/381* (2013.01); *H02S 40/34* (2014.12); *H02J 2300/26* (2020.01)

(58) Field of Classification Search
CPC .......... H02S 40/32; H02S 40/34; H02J 3/381; H02J 2300/26; H02J 1/102
See application file for complete search history.

(56) References Cited

U.S. PATENT DOCUMENTS 5,079,686 A * 1/1992 Vinciarelli ............. H02J 1/102
363/95
6,979,985 B2 * 12/2005 Yoshida ............. H02M 3/1588
323/282

(Continued)

FOREIGN PATENT DOCUMENTS

CN    102611355 A    7/2012
CN    104079001 A    10/2014

(Continued)

OTHER PUBLICATIONS

International Search Report and Written Opinion in International Appln. No. PCT/CN2020/138170, mailed on Aug. 26, 2021, 15 pages (with English translation).

(Continued)

*Primary Examiner* — Daniel Cavallari
*Assistant Examiner* — Brian K Baxter
(74) *Attorney, Agent, or Firm* — Fish & Richardson P.C.

(57) ABSTRACT

An example system includes an inverter and at least one combiner box. The combiner box includes a plurality of direct current-direct current (DC-DC) circuits and one controller. The controller is configured to: when an output voltage of the combiner box is greater than or equal to a first preset voltage and less than or equal to a second preset voltage, control the combiner box to output a maximum power. When the output voltage of the combiner box is greater than the second preset voltage, the controller controls an output power of the combiner box to decrease as the output voltage increases. The second preset voltage is greater than the first preset voltage, and the maximum power is a sum of maximum powers of all photovoltaic strings connected to the combiner box.

20 Claims, 7 Drawing Sheets

(56) References Cited

U.S. PATENT DOCUMENTS

| | | | | |
|---|---|---|---|---|
| 9,502,895 | B1* | 11/2016 | Casey | H02J 3/46 |
| 9,812,984 | B2* | 11/2017 | Yoscovich | H02J 3/46 |
| 9,899,869 | B1* | 2/2018 | McCracken | H02M 7/42 |
| 11,476,800 | B1* | 10/2022 | Olson, Jr. | H02M 3/00 |
| 11,626,837 | B2* | 4/2023 | Yu | H02J 3/381 |
| | | | | 307/78 |
| 12,100,962 | B2* | 9/2024 | Brogan | H02J 3/381 |
| 2006/0056208 | A1* | 3/2006 | Somerville | H02M 3/073 |
| | | | | 363/60 |
| 2009/0179500 | A1* | 7/2009 | Ragonese | H02J 1/10 |
| | | | | 307/82 |
| 2010/0237703 | A1* | 9/2010 | Stern | H02S 40/34 |
| | | | | 307/77 |
| 2010/0295377 | A1* | 11/2010 | Sok | H02J 3/46 |
| | | | | 307/82 |
| 2012/0188806 | A1* | 7/2012 | Tamura | H02J 3/381 |
| | | | | 363/95 |
| 2015/0194925 | A1 | 7/2015 | Goto | |
| 2015/0333503 | A1* | 11/2015 | Bermingham | H02H 7/268 |
| | | | | 361/62 |
| 2016/0372926 | A1* | 12/2016 | Pahlevaninezhad | H02J 3/381 |
| 2017/0264099 | A1* | 9/2017 | Zhang | H02J 3/38 |
| 2017/0324329 | A1* | 11/2017 | Zhang | H02M 3/158 |
| 2017/0346298 | A1* | 11/2017 | Chuang | G05F 5/00 |
| 2018/0006579 | A1* | 1/2018 | Matsuoka | H02J 3/381 |
| 2018/0041163 | A1* | 2/2018 | White | H02S 50/10 |
| 2018/0062015 | A1* | 3/2018 | Ni | G05F 1/67 |
| 2018/0212426 | A1* | 7/2018 | Har-Shai | H01L 31/02021 |
| 2018/0287556 | A1* | 10/2018 | Tao | H02S 40/36 |
| 2018/0331242 | A1* | 11/2018 | Grimmett | H01L 31/0475 |
| 2018/0342873 | A1* | 11/2018 | Wang | H02S 40/34 |
| 2018/0351366 | A1* | 12/2018 | Handelsman | H02J 1/102 |
| 2019/0173419 | A1* | 6/2019 | Yan | H02S 40/36 |
| 2019/0288641 | A1* | 9/2019 | Macerini | H02S 50/00 |
| 2020/0083715 | A1* | 3/2020 | Yoscovich | H02J 3/381 |
| 2021/0058030 | A1* | 2/2021 | Liu | H02S 50/10 |
| 2021/0135455 | A1* | 5/2021 | Marinopoulos | H02S 40/32 |
| 2021/0367514 | A1* | 11/2021 | Lawrence | H02M 3/156 |
| 2022/0158443 | A1* | 5/2022 | Zhang | H02H 3/087 |
| 2022/0209713 | A1* | 6/2022 | Salari | H02M 1/007 |
| 2022/0224111 | A1* | 7/2022 | Amthor | H02J 3/381 |
| 2023/0344382 | A1* | 10/2023 | Zheng | H02S 40/44 |

FOREIGN PATENT DOCUMENTS

| | | |
|---|---|---|
| CN | 205490140 U | 8/2016 |
| CN | 107154780 A | 9/2017 |
| CN | 107994614 A | 5/2018 |
| CN | 108258718 A | 7/2018 |
| CN | 106410854 B | 3/2019 |
| EP | 2437387 A2 | 4/2012 |
| JP | 2001255949 A | 9/2001 |
| WO | 2020133056 A1 | 7/2020 |

OTHER PUBLICATIONS

Extended European Search Report in European ApplN No. 20966276.6, dated Jan. 9, 2024, 6 pages.

* cited by examiner

PHOTOVOLTAIC POWER GENERATION SYSTEM, POWER CONTROL METHOD, AND COMBINER BOX

CROSS-REFERENCE TO RELATED APPLICATIONS

This application is a continuation of International Application No. PCT/CN2020/138170, filed on Dec. 22, 2020, the disclosure of which is hereby incorporated by reference in its entirety.

TECHNICAL FIELD

This application relates to the field of photovoltaic power generation technologies, and in particular, to a photovoltaic power generation system, a power control method, and a combiner box.

BACKGROUND

At present, a photovoltaic power generation system mainly includes a single-stage power conversion mode and a two-stage power conversion mode. The single-stage power conversion mode means that a direct current of a photovoltaic array is converted into an alternating current through a direct current-alternating current (DC-AC) circuit, and the two-stage power conversion mode means that a direct current of a photovoltaic array performs first-stage direct conversion through a direct current-direct current (DC-DC) circuit, and then is converted into an alternating current through a second-stage DC-AC circuit.

Because the two-stage power conversion mode is more efficient than the single-stage power conversion mode, the two-stage power conversion mode is increasingly widely used in the photovoltaic power generation system.

However, because the two-stage power conversion mode includes the DC-DC circuit and the DC-AC circuit, power control between the DC-DC circuit and the DC-AC circuit needs to depend on high-speed communication between the DC-DC circuit and the DC-AC circuit. When a communication speed between the DC-DC circuit and the DC-AC circuit is slow, power control is affected.

SUMMARY

This application provides a photovoltaic power generation system and a power control method, so that fast power control can be performed between a DC-DC circuit and a DC-AC circuit without depending on high-speed communication between the DC-DC circuit and the DC-AC circuit.

An embodiment of this application provides a photovoltaic power generation system, including an inverter and at least one combiner box. The combiner box includes a plurality of direct current-direct current DC-DC circuits and one controller. Output ends of the plurality of DC-DC circuits in the combiner box are connected in parallel to an input end of the inverter. An input end of each DC-DC circuit is connected to a corresponding photovoltaic string, and an input end of the combiner box is generally connected to a plurality of photovoltaic strings. The controller of the combiner box is configured to: when an output voltage of the combiner box is greater than or equal to a first preset voltage and less than or equal to a second preset voltage, control the combiner box to output maximum power; and when the output voltage of the combiner box is greater than the second preset voltage, control output power of the combiner box to decrease as the output voltage increases. The second preset voltage is greater than the first preset voltage, and the maximum power is a sum of maximum power of all photovoltaic strings connected to the combiner box.

Generally, the first preset voltage is greater than or equal to a maximum value of voltages corresponding to maximum power points of all the photovoltaic strings connected to the combiner box, and the second preset voltage is greater than or equal to a minimum direct current voltage corresponding to a case in which the inverter is in a linear modulation area, that is, greater than a direct current bus voltage required by the inverter, that is, a peak line voltage at an alternating current output end of the inverter. When the inverter works, there is a requirement for the direct current bus voltage. Therefore, the second preset voltage may be set based on the direct current bus voltage sent by the inverter.

To resolve a technical problem that power control is highly dependent on high-speed communication, the embodiment of this application provides a power control solution, so that control over output power of the DC-DC circuit can be implemented without depending on high-speed communication. In this solution, the combiner box independently implements control over the output power of the combiner box without depending on a power limiting instruction sent by a controller of the inverter. For the inverter, the combiner box may be considered as a photovoltaic string, that is, the combiner box is virtualized as a photovoltaic source. Because the photovoltaic string has an output power-output voltage curve, that is, a PV curve, the output voltage and the output power of the combiner box also have characteristics similar to the PV curve of the photovoltaic string. The combiner box may control the output power based on a range in which the output voltage is located, so that the combiner box is not controlled by the inverter, and does not depend on high-speed communication between the combiner box and the inverter. Even if a communication speed between the inverter and the combiner box is relatively low, fast control over the output power by the combiner box is not affected.

When the output voltage of the combiner box is greater than the second preset voltage, a specific control manner of the output power of the combiner box is that the output power of the combiner box decreases as the output voltage of the combiner box increases, and may decrease proportionally or may not decrease proportionally. This is not specifically limited in this embodiment of this application.

In a possible implementation, the controller of the combiner box is specifically configured to control, based on the output voltage of the combiner box, an open-circuit voltage of the combiner box, and the second preset voltage, the output power of the combiner box to decrease as the output voltage increases, where the open-circuit voltage of the combiner box is greater than a maximum value of open-circuit voltages of all the photovoltaic strings connected to the combiner box.

In a possible implementation, the controller of the combiner box is specifically configured to control, according to the following formula, the output power of the combiner box to decrease as the output voltage increases:

$$P_{outmax}\left[1 - \frac{(u_{out} - U_{mppt2})^2}{(U_{oc} - U_{mppt2})^2}\right]$$

$P_{outmax}$ is the maximum power; $u_{out}$ is the output voltage of the combiner box; $U_{mppt2}$ is the second preset voltage; and $U_{oc}$ is the open-circuit voltage of the combiner box.

In a possible implementation, the combiner box includes at least two of the following: a first combiner box and a second combiner box.

A second preset voltage of the first combiner box is greater than a first preset voltage of the second combiner box, and a second preset voltage of the second combiner box is greater than a first preset voltage of the first combiner box.

In a possible implementation, the controller of the combiner box is configured to adjust an output voltage of a corresponding photovoltaic string to adjust the output power of the combiner box.

In a possible implementation, the system further includes an inverter controller.

The inverter controller is configured to control output power of the inverter based on a power limiting instruction value.

An embodiment of this application further provides a power control method for a photovoltaic power generation system. The system includes an inverter and at least one combiner box. The combiner box includes a plurality of direct current-direct current DC-DC circuits and one controller. Output ends of the plurality of DC-DC circuits in the combiner box are connected in parallel to an input end of the inverter. An input end of each DC-DC circuit is connected to a corresponding photovoltaic string. The method includes: when an output voltage of the combiner box is greater than or equal to a first preset voltage and less than or equal to a second preset voltage, controlling the combiner box to output maximum power; and when the output voltage of the combiner box is greater than the second preset voltage, controlling output power of the combiner box to decrease as the output voltage increases. The second preset voltage is greater than the first preset voltage, and the maximum power is a sum of maximum power of all photovoltaic strings connected to the combiner box.

In a possible implementation, the first preset voltage is greater than or equal to a maximum value of voltages corresponding to maximum power points of all the photovoltaic strings connected to the combiner box, and the second preset voltage is greater than or equal to a minimum direct current voltage corresponding to a case in which the inverter is in a linear modulation area.

In a possible implementation, the controlling output power of the combiner box to decrease as the output voltage increases specifically includes: controlling, based on the output voltage of the combiner box, an open-circuit voltage of the combiner box, and the second preset voltage, the output power of the combiner box to decrease as the output voltage increases. The open-circuit voltage of the combiner box is greater than a maximum value of open-circuit voltages of all the photovoltaic strings connected to the combiner box.

In a possible implementation, specifically, the output power of the combiner box is controlled according to the following formula to decrease as the output voltage increases:

$$P_{outmax}\left[1 - \frac{(u_{out} - U_{mppt2})^2}{(U_{oc} - U_{mppt2})^2}\right]$$

$P_{outmax}$ is the maximum power; $u_{out}$ is the output voltage of the combiner box; $U_{mppt2}$ is the second preset voltage; and $U_{oc}$ is the open-circuit voltage of the combiner box.

In a possible implementation, the method further includes: adjusting an output voltage of a corresponding photovoltaic string to adjust the output power of the combiner box.

An embodiment of this application further provides a combiner box, including: a plurality of DC-DC circuits and a controller of the combiner box. An input end of each DC-DC circuit is connected to a corresponding photovoltaic string. Output ends of the plurality of DC-DC circuits are connected in parallel and are configured to connect to an input end of an inverter. The controller of the combiner box is configured to: when an output voltage is greater than or equal to a first preset voltage and less than or equal to a second preset voltage, control the combiner box to output maximum power, where the maximum power is a sum of maximum power of all photovoltaic strings connected to the combiner box, and the second preset voltage is greater than the first preset voltage; and when the output voltage of the combiner box is greater than the second preset voltage, control output power of the combiner box to decrease as the output voltage increases.

In a possible implementation, the first preset voltage is greater than or equal to a maximum value of voltages corresponding to maximum power points of all the photovoltaic strings connected to the combiner box, and second preset voltage is greater than or equal to a minimum direct current voltage corresponding to a case in which the inverter is in a linear modulation area. The controller of the combiner box is specifically configured to control, based on the output voltage of the combiner box, an open-circuit voltage of the combiner box, and a second preset voltage, the output power of the combiner box to decrease as the output voltage increases. The open-circuit voltage of the combiner box is greater than a maximum value of open-circuit voltages of all the photovoltaic strings connected to the combiner box.

It can be learned from the foregoing technical solutions that embodiments of this application have the following advantages:

In the embodiments of this application, control over the output power of the combiner box no longer depends on the power limiting instruction sent by the controller of the inverter, but the combiner box independently implements control over the output power. For the inverter, the combiner box may be considered as a photovoltaic string, that is, the combiner box is virtualized as a photovoltaic source. Because the photovoltaic string has an output power-output voltage curve, that is, a PV curve, the output voltage and the output power of the combiner box also have characteristics similar to the PV curve of the photovoltaic string. When the output voltage of the combiner box is greater than or equal to the first preset voltage and less than or equal to the second preset voltage, the combiner box is controlled to output the maximum power. The maximum power is the sum of the maximum power of all the photovoltaic strings connected to the combiner box. When the output voltage of the combiner box is greater than the second preset voltage, the output power of the combiner box is controlled to decrease as the output voltage increases, that is, the output power of the combiner box presents a droop characteristic. The combiner box may control the output power based on a range in which the output voltage is located, so that the combiner box is not controlled by the inverter, and does not depend on high-speed communication between the combiner box and the inverter. Even if a communication speed between the inverter and the combiner box is relatively low, fast control over the output power by the combiner box is not affected.

DESCRIPTION OF EMBODIMENTS

The following terms "first", "second", and the like are merely intended for a purpose of description, and shall not be understood as an indication or implication of relative importance or implicit indication of a quantity of indicated technical characteristics. Therefore, a feature limited by "first" or "second" may explicitly or implicitly include one or more features. In description of this application, unless otherwise stated, "a plurality of" means two or more than two.

In addition, in this application, orientation terms such as "up" and "down" may include but are not limited to orientations of schematically placed components in relative accompanying drawings. It should be understood that these orientation terms may be relative concepts. The orientation terms are used for relative description and clarification, and may vary correspondingly based on a change in an orientation in which the component is placed in the accompanying drawings.

In this application, unless otherwise specified and limited, the term "connection" should be understood in a broad sense. For example, the "connection" may be a fixed connection, a detachable connection, an integration, a direct connection, or an indirect connection through an intermediate medium. In addition, a term "coupling" may be a manner of implementing an electrical connection for signal transmission. The "coupling" may be a direct electrical connection, or may be an indirect electrical connection through an intermediate medium.

System Embodiment

To enable a person skilled in the art to better understand the technical solutions provided in embodiments of this application, the following describes a two-stage photovoltaic power generation system provided in the embodiments of this application.

Figure 1:
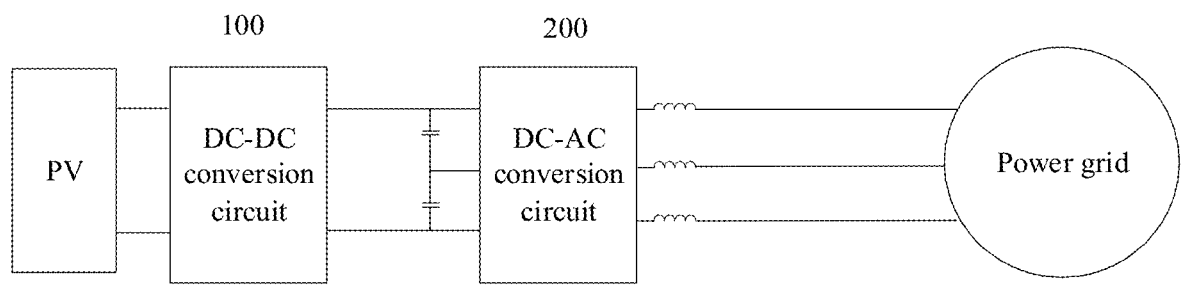
FIG. 1 is a schematic diagram of a photovoltaic power generation system according to an embodiment of this application.

FIG. 1 is a schematic diagram of a photovoltaic power generation system according to an embodiment of this application.

In this embodiment of this application, a three-phase alternating current output by the photovoltaic power generation system is used as an example for description.

The photovoltaic power generation system includes a photovoltaic array PV, a DC-DC circuit 100, and a DC-AC circuit 200.

An input end of the DC-DC circuit 100 is connected to the photovoltaic array PV, and an input end of the DC-AC circuit 200 is connected to an output end of the DC-DC circuit 100.

A specific implementation form of the DC-DC circuit 100 is not specifically limited in this embodiment of this application. For example, the DC-DC circuit 100 may include a boost circuit, a buck circuit, or a buck/boost circuit.

In an implementation, the input end of the DC-AC circuit 200 is connected to a plurality of DC-DC circuits 100, output ends of the plurality of DC-DC circuits 100 are connected in parallel, and the plurality of DC-DC circuits 100 are integrated in one cabinet, for example, may be integrated in a combiner box. The DC-AC circuit 200 is integrated in an inverter.

In actual work, the DC-DC circuit 100 generally does not work at a maximum power point, but controls output power of the DC-DC circuit 100 according to a power limiting instruction sent by a controller of the inverter. To be specific, in most cases, the output power is less than maximum power, and the DC-DC circuit 100 works in a power limiting state. The controller of the inverter is located on one side of the DC-AC circuit 200. Generally, a distance between the inverter and the combiner box is relatively long, and work of the DC-DC circuit 100 needs to be controlled by an instruction of the controller. For example, the DC-DC circuit adjusts the output power according to the power limiting instruction of the controller. A signal sent by the controller to the DC-DC circuit 100 depends on high-speed communication. When a communication speed between the DC-DC circuit 100 and the controller is relatively slow, a response speed of the DC-DC circuit 100 is severely affected. Therefore, power corresponding to the power limiting instruction cannot be output in a timely manner.

FIG. 1 is merely an example. In actual operation, the input end of the DC-AC circuit 200 may be connected to output ends of a plurality of DC-DC circuits, that is, output ends of the plurality of DC-DC circuits are connected in parallel, and an input end of each DC-DC circuit is connected to a photovoltaic string corresponding to the DC-DC circuit. To improve power, the input end of each DC-DC circuit may be connected to a plurality of photovoltaic strings connected in parallel.

To resolve a technical problem that power control is highly dependent on high-speed communication, this embodiment of this application provides a power control solution, so that control over the output power of the DC-DC circuit 100 can be implemented without depending on high-speed communication.

Figure 2:
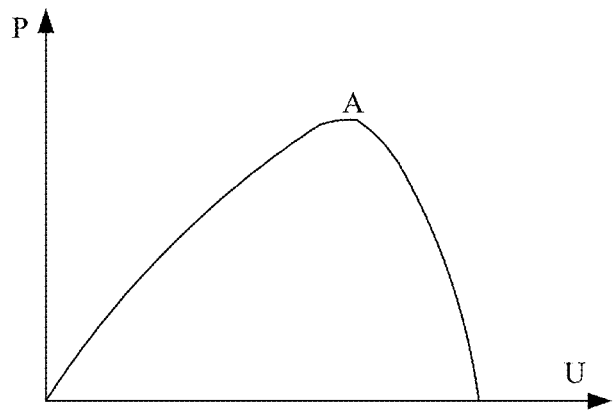
FIG. 2 is a schematic diagram of a PV curve of a photovoltaic string according to an embodiment of this application.

In this embodiment of this application, control over output power of the combiner box no longer depends on the power limiting instruction sent by the controller of the inverter, but the combiner box independently implements control over the output power. For the inverter, the combiner box may be considered as a photovoltaic string, that is, the combiner box is virtualized as a photovoltaic source. Because the photovoltaic string has an output power-output voltage curve, that is, a PV curve shown in FIG. 2. FIG. 2 is a schematic diagram of a PV curve of a photovoltaic string according to an embodiment of this application.

In FIG. 2, a horizontal coordinate is an output voltage of the photovoltaic string, and a vertical coordinate is output power of the photovoltaic string.

It can be learned from FIG. 2 that the PV curve has a droop characteristic, that is, the output power decreases as the output voltage increases after a maximum power point S. A combiner box controls the output power based on a virtual PV curve, so that the combiner box does not depend on a power limiting instruction sent by an inverter side, and does not depend on high-speed communication between the combiner box and an inverter, thereby eliminating impact caused by high-speed communication.

The following describes in detail the photovoltaic power generation system provided in this embodiment of this application with reference to the accompanying drawings.

Figure 3:
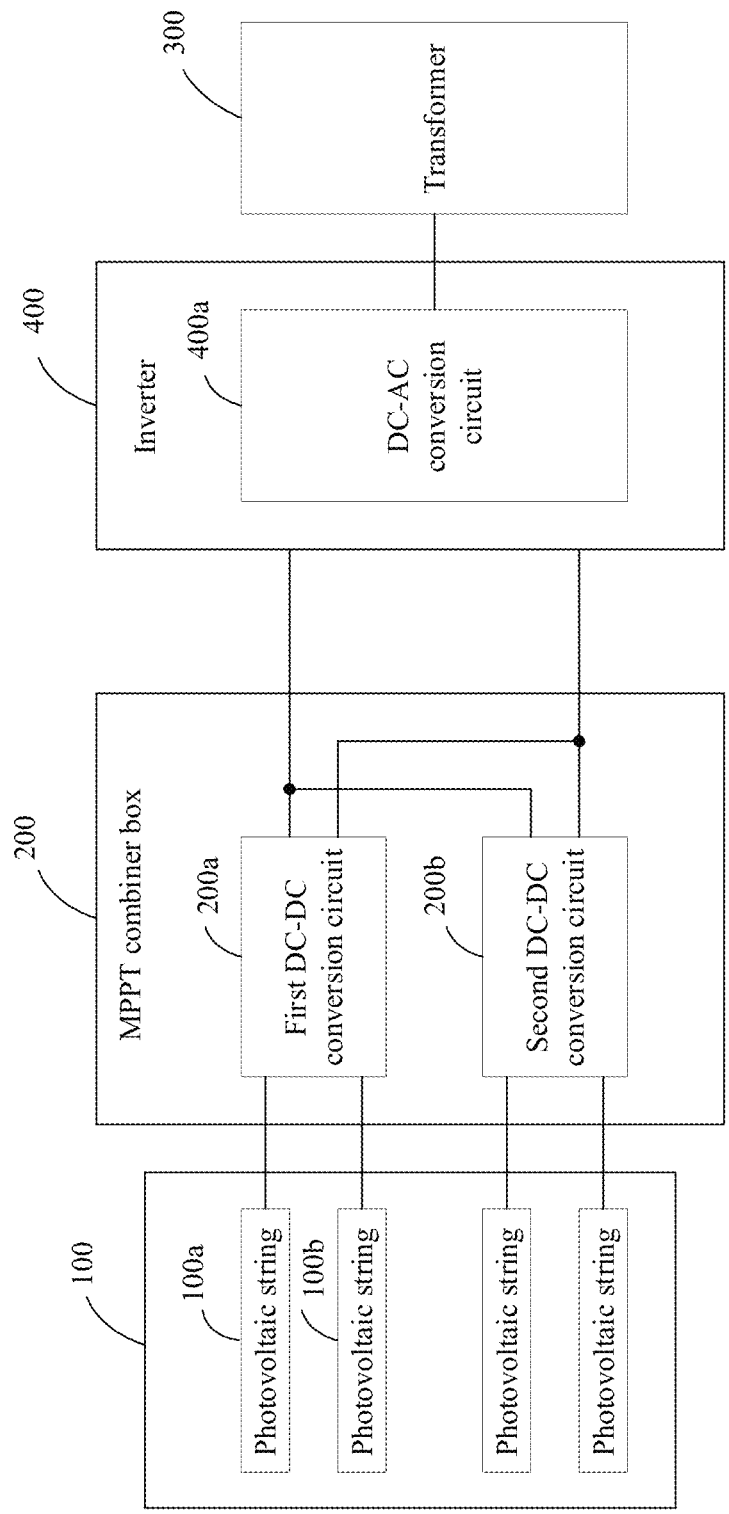
FIG. 3 is a schematic diagram of another photovoltaic power generation system according to an embodiment of this application.

FIG. 3 is a schematic diagram of another photovoltaic power generation system according to an embodiment of this application.

For ease of understanding and description, in this embodiment of this application, an example in which a combiner box includes at least two DC-DC circuits is used for description. In specific implementation, a quantity of DC-DC circuits may be set based on an actual requirement.

It should be noted that a direct current bus voltage is an output voltage of the combiner box, that is, an input voltage of an inverter.

In this embodiment of this application, an example in which the combiner box has a maximum power point tracking (MPPT) function is used for description. It should be understood that the combiner box may alternatively not have the MPPT function. This is not specifically limited in this embodiment of this application.

The photovoltaic power generation system provided in this embodiment of this application includes an inverter 400 and at least one MPPT combiner box 200. The combiner box 200 includes a plurality of direct current-direct current DC-DC circuits and one controller (not shown in the figure). Output ends of the plurality of DC-DC circuits in the combiner box are connected in parallel to an input end of the inverter. An input end of each DC-DC circuit is connected to a corresponding photovoltaic string.

FIG. 3 is described by using an example in which the combiner box includes at least the following two DC-DC circuits, that is, a first DC-DC circuit 200*a* and a second DC-DC circuit 200*b*. An input end of the first DC-DC circuit 200*a* is connected to a corresponding photovoltaic string 100*a* and a corresponding photovoltaic string 100*b*. An input end of the second DC-DC circuit 200*b* is connected to a corresponding photovoltaic string. In this embodiment of this application, a quantity of photovoltaic strings connected to the input end of the DC-DC circuit is not limited, and all photovoltaic strings may be connected in parallel and then connected to the input end of the DC-DC circuit.

The controller of the combiner box controls output power based on the output voltage, and is specifically configured to: when the output voltage of the combiner box is greater than or equal to a first preset voltage and less than or equal to a second preset voltage, control the combiner box to output maximum power, where the maximum power is a sum of maximum power of all photovoltaic strings connected to the combiner box; and when the output voltage of the combiner box is greater than the second preset voltage, control the output power of the combiner box to decrease as the output voltage increases, where the second preset voltage is greater than the first preset voltage.

To make a person skilled in the art better understand the technical solutions described in this embodiment of this application, the following describes the first preset voltage and the second preset voltage with reference to a curve diagram.

Figure 4:
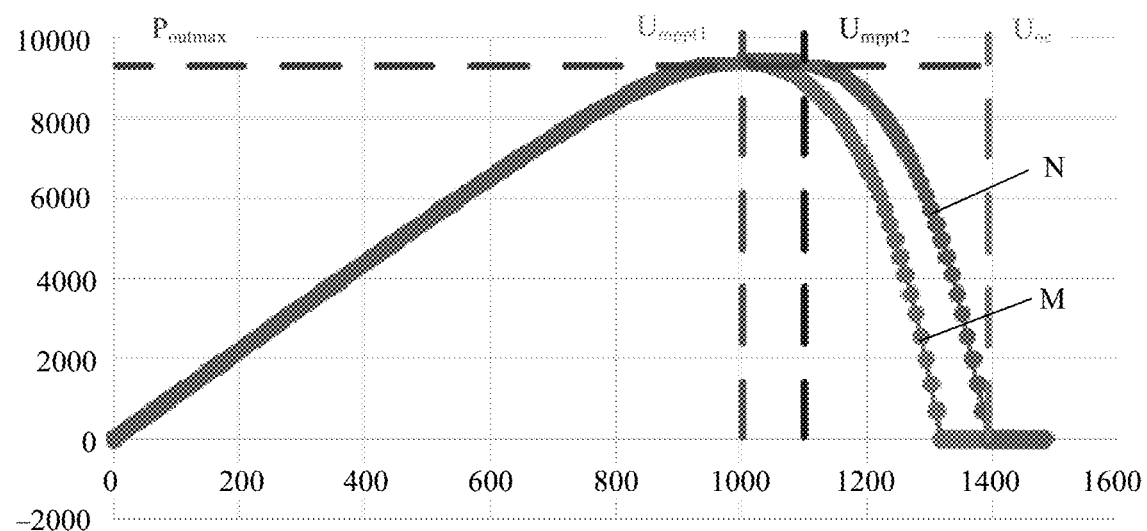
FIG. 4 is a schematic diagram of a PV curve of a combiner box according to an embodiment of this application.

FIG. 4 is a schematic diagram of a PV curve of a combiner box according to an embodiment of this application.

For ease of understanding, in FIG. 4, an example in which one combiner box includes one DC-DC circuit and an input end of one DC-DC circuit is connected to one photovoltaic string is used for description.

In FIG. 4, a curve M is an input PV curve of the combiner box, and a curve N is an output PV curve of the combiner box. An input end of the combiner box is connected to the photovoltaic string, that is, the curve M is a PV curve of the photovoltaic string.

To enable both the photovoltaic string and the combiner box to work in a stable state, an output voltage range of the combiner box needs to be greater than or equal to a first preset voltage, that is, greater than Umppt1 in FIG. 4.

The first preset voltage is greater than or equal to a maximum value of voltages corresponding to maximum power points of all photovoltaic strings connected to the combiner box. To be specific, the first preset voltage is no less than the maximum value of the voltages corresponding to the maximum power points of all the photovoltaic strings connected to the combiner box. For example, if the combiner box is connected to four photovoltaic strings, the first preset voltage is greater than or equal to a maximum value of voltages corresponding to maximum power points of the four photovoltaic strings, that is, greater than or equal to a maximum value of four voltages.

A second preset voltage Umppt2 is greater than or equal to a minimum direct current voltage corresponding to a case in which an inverter is in a linear modulation area, that is, greater than a direct current bus voltage required by the inverter, that is, a peak line voltage at an alternating current output end of the inverter. When the inverter works, there is a requirement for the direct current bus voltage. Therefore, the second preset voltage may be set based on the direct current bus voltage sent by the inverter.

Uoc in FIG. 4 is an open-circuit voltage corresponding to a virtual PV curve of the combiner box. The open-circuit voltage Uoc of the combiner box needs to be greater than a maximum value of open-circuit voltages of all the PV strings connected to the combiner box. For example, the input end of the combiner box is connected to four photovoltaic strings. Uoc of the combiner box needs to be greater than a maximum value of open-circuit voltages of the four photovoltaic strings.

It can be learned from FIG. 4 that there is a straight line stage in the PV curve of the combiner box, that is, when an output voltage is between Umppt1 and Umppt2, output power of the combiner box is a fixed value, that is, maximum power. The maximum power is the sum of maximum power of all the photovoltaic strings connected to the combiner box. For example, if the combiner box is connected to four photovoltaic strings, the maximum power is a sum of power corresponding to maximum power points of the four photovoltaic strings.

When the output voltage of the combiner box is greater than Umppt2, the output power of the combiner box presents a monotonically decreasing trend with the output voltage.

In this embodiment of this application, the monotonically decreasing trend of the output power with the output voltage is not limited. For example, the monotonically decreasing trend of the output power may be the same as that of the photovoltaic string connected to the input end, or may be a proportional decrease of a linear monotonically decreasing, or may be a decrease similar to a parabolic, provided that monotonically decreasing is ensured.

The following provides a possible monotonically decreasing implementation, for example, s controller of the combiner box is specifically configured to control, based on the output voltage of the combiner box, the open-circuit voltage of the combiner box, and the second preset voltage, the output power of the combiner box to decrease as the output voltage increases.

The controller of the combiner box is specifically configured to control, according to the following formula based on the output voltage of the combiner box, the open circuit voltage of the combiner box, and the second preset voltage, the output power of the combiner box to decrease as the output voltage increases:

$$P_{out} = P_{outmax}\left[1 - \frac{(u_{out} - U_{mppt2})^2}{(U_{oc} - U_{mppt2})^2}\right]$$

$P_{out}$ is the output power of the combiner box, $P_{outmax}$ is the maximum power, $u_{out}$ is the output voltage of the combiner box, $U_{mppt2}$ is the second preset voltage, and $U_{oc}$ is the open-circuit voltage of the combiner box.

It can be learned from the foregoing formula that a larger output voltage of the combiner box indicates smaller output power of the combiner box.

The foregoing formula is merely an example, and may also be another simple variation of the foregoing formula, provided that it is ensured that the output power of the combiner box presents a decreasing trend as the output voltage increases.

It can be learned from the foregoing analysis that, in the technical solutions provided in this embodiment of this application, control over the combiner box on the output power of the combiner box does not depend on a power limiting instruction sent by an inverter side, but controls the output power of the combiner box based on the output voltage of the combiner box constantly.

During specific implementation, the controller of the combiner box may adjust the output power of the combiner box by adjusting an output voltage of the photovoltaic string connected to the input end of the combiner box. When the output voltage of the photovoltaic string changes, output power of the photovoltaic string is affected, that is, a characteristic of the PV curve is met. However, when a power loss is ignored, the output power of the photovoltaic string is input power of the combiner box, and the input power of the combiner box is equal to the output power of the combiner box.

Control over output power of the inverter is implemented by the inverter itself, that is, an inverter controller is configured to control the output power of the inverter based on power required by the photovoltaic power generation system. To be specific, the inverter directly controls the output power of the inverter, and does not need to send the power limiting instruction to the combiner box, and then the combiner box adjusts the output power of the container box. Therefore, impact of a communication speed between the inverter and the combiner box can be avoided. In this embodiment of this application, control over the combiner box on the output power of the combiner box may also be implemented in low-speed communication. The output power of the inverter essentially comes from the output power of the combiner box. Therefore, the output power of the inverter is a straight line parallel to a horizontal axis in FIG. 4. There is an intersection point between the straight line and the PV curve of the combiner box, and the intersection point is a power limiting point of the inverter.

In the foregoing embodiment, only one combiner box is used as an example for description. The following describes a case in which the input end of the inverter is connected to at least two combiner boxes.

Figure 5:
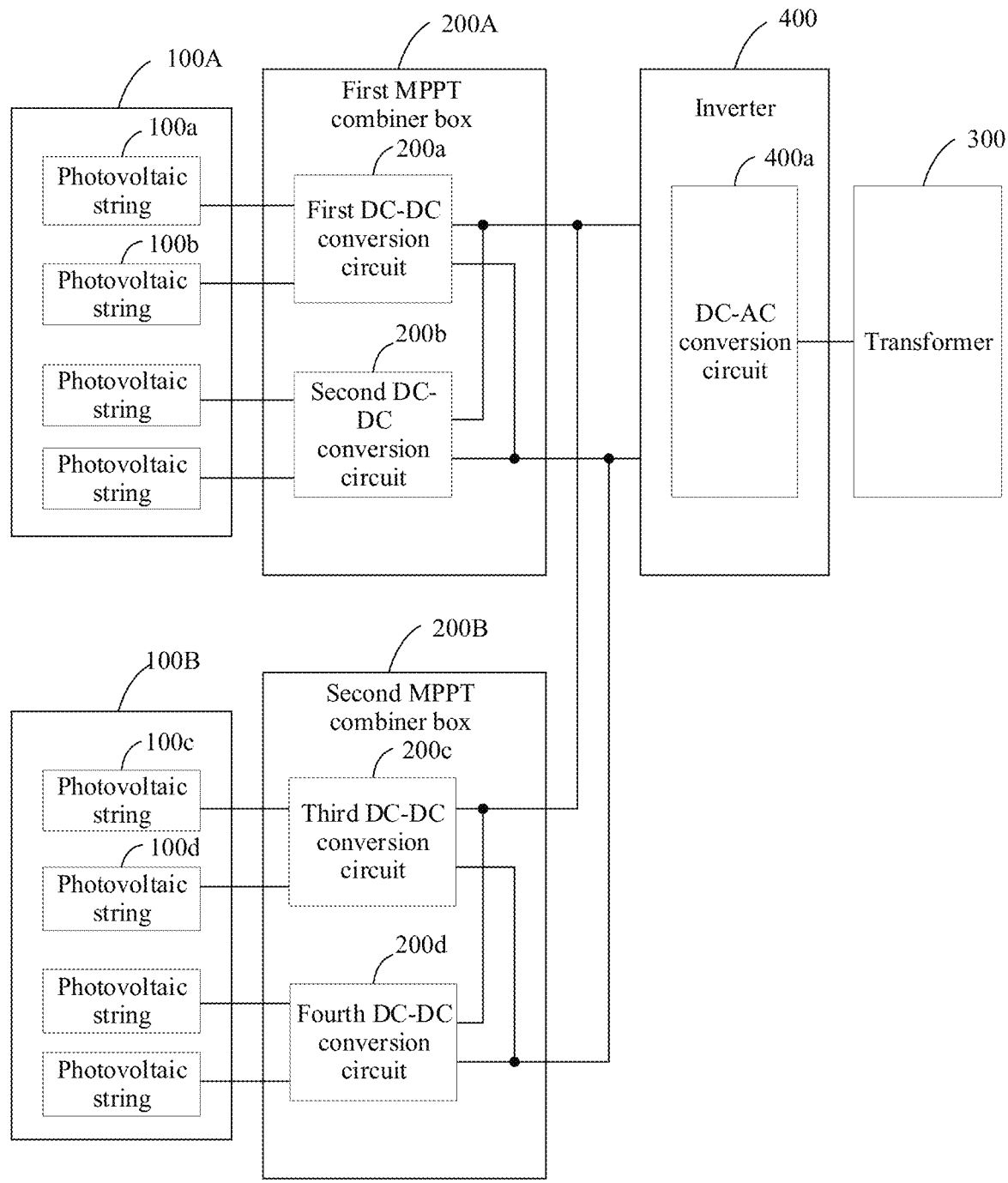
FIG. 5 is a schematic diagram of still another photovoltaic power generation system according to an embodiment of this application.

FIG. 5 is a schematic diagram of still another photovoltaic power generation system according to an embodiment of this application.

In FIG. 5, two combiner boxes may be used as an example for description, and an MPPT combiner box is still used as an example. It should be understood that the input end of the inverter 400 may be connected to more combiner boxes. The two combiner boxes in FIG. 5 are respectively a first MPPT combiner box 200A and a second MPPT combiner box 200B.

The first MPPT combiner box 200A includes at least two DC-DC conversion circuits, that is, a first DC-DC conversion circuit 200a and a second DC-DC conversion circuit 200b. An input end of the first DC-DC conversion circuit 200a is connected to a corresponding photovoltaic string 100a and a corresponding photovoltaic string 100b. Generally, the photovoltaic string 100a and the photovoltaic string 100b are connected in parallel to the input end of the first DC-DC conversion circuit 200a. Similarly, the second DC-DC conversion circuit 200b is connected to a photovoltaic string corresponding to the second DC-DC conversion circuit 200b.

The second MPPT combiner box 200B includes at least two DC-DC conversion circuits, that is, a third DC-DC conversion circuit 200c and a fourth DC-DC conversion circuit 200d. An input end of the third DC-DC conversion circuit 200c is connected to a corresponding photovoltaic string 100c and a corresponding photovoltaic string 100d. Generally, the photovoltaic string 100c and the photovoltaic string 100d are connected in parallel to the input end of the third DC-DC conversion circuit 200c. Similarly, the fourth DC-DC conversion circuit 200d is connected to a photovoltaic string corresponding to the fourth DC-DC conversion circuit 200d.

When the input end of the inverter is connected to a plurality of combiner boxes, maximum power of the plurality of combiner boxes has a common range, so that a maximum power point of the plurality of combiner boxes can be tracked. Therefore, to make the maximum power of the plurality of combiner boxes have the common range, two combiner boxes are still used as an example. A second preset voltage of the first combiner box needs to be greater than a first preset voltage of the second combiner box, and a second preset voltage of the second combiner box needs to be greater than a first preset voltage of the first combiner box. To be specific, a second preset voltage of each combiner box needs to be greater than first preset voltages of all combiner boxes, to ensure that maximum power of all the combiner boxes has a common range.

Figure 6:
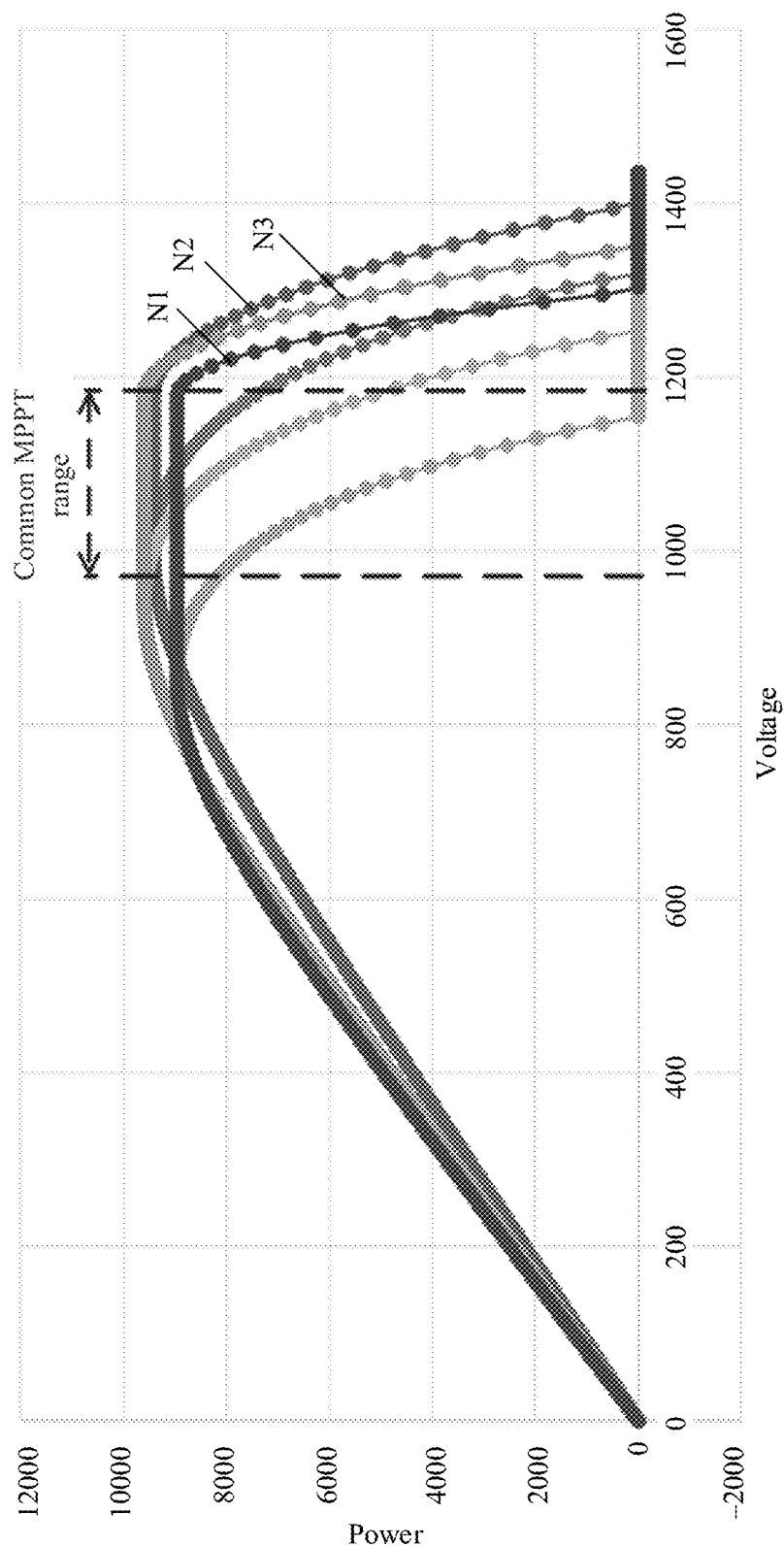
FIG. 6 is a schematic diagram of PV curves of a plurality of combiner boxes according to an embodiment of this application.

For a person skilled in the art to better understand that maximum power of PV curves of a plurality of combiner boxes has a common range, FIG. 6 may be referred to. FIG. 6 is a schematic diagram of PV curves of a plurality of combiner boxes according to an embodiment of this application.

It can be learned from FIG. 6 that curves N1, N2, and N3 respectively represent PV curves of three different combiner boxes.

There is a common MPPT range in maximum power ranges of N1, N2, and N3. Three curves not marked in FIG.

6 are respectively PV curves of photovoltaic strings connected to input ends of the three combiner boxes. Because the maximum power ranges of N1, N2, and N3 are all straight lines, maximum power of the three combiner boxes can be tracked provided that the three straight lines have a common overlapping part. When an input end of an inverter is connected to three combiner boxes, maximum power is a sum of the maximum power of the three combiner boxes.

For example, a first preset voltage and a second preset voltage that are corresponding to a maximum power range of N1 are respectively 1000 V and 1150 V, and a first preset voltage and a second preset voltage that are corresponding to a maximum power range of N2 are respectively 1050 V and 1200 V. In this case, a voltage range corresponding to overlapping maximum power of N1 and N2 is 1050 V to 1150 V.

According to the photovoltaic power generation system provided in this embodiment of this application, the combiner box is virtualized as a similar photovoltaic panel with a droop characteristic of output power. From a perspective of an inverter connected to a downstream of the combiner box, the combiner box may be considered as a new photovoltaic string, so that fast scheduling of the output power of the combiner box can be implemented without depending on high-speed communication. In this embodiment of this application, each combiner box may be considered as a photovoltaic source. When there are a plurality of combiner boxes, power control over the plurality of combiner boxes can be implemented by setting a maximum power range for the plurality of combiner boxes. For the inverter, the inverter may implement power scheduling quickly in a power control manner of a single-stage power conversion system. To be specific, when the combiner box is considered as a PV source, a two-stage photovoltaic power generation system may be equivalent to a single-stage photovoltaic power generation system, and control is implemented in a power scheduling manner of the single-stage photovoltaic power generation system.

Method Embodiment

According to the photovoltaic power generation system provided in the foregoing embodiment, an embodiment of this application further provides a power control method for a photovoltaic power generation system. The following provides detailed descriptions with reference to the accompanying drawings.

Figure 7:
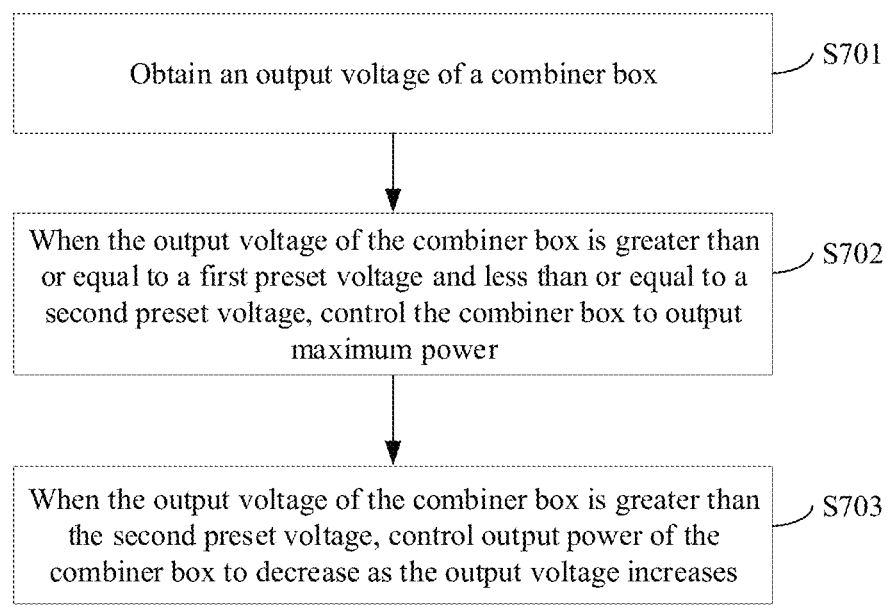
FIG. 7 is a flowchart of a power control method for a photovoltaic power generation system according to an embodiment of this application.

FIG. 7 is a flowchart of a power control method for a photovoltaic power generation system according to an embodiment of this application.

The power control method for a photovoltaic power generation system provided in this embodiment is applied to the photovoltaic power generation system provided in the foregoing embodiment. The system includes an inverter and at least one combiner box. The combiner box includes a plurality of direct current-direct current DC-DC circuits and one controller. Output ends of the plurality of DC-DC circuits in the combiner box are connected in parallel to an input end of the inverter. An input end of each DC-DC circuit is connected to a corresponding photovoltaic string.

The method includes the following steps.

S701: Obtain an output voltage of the combiner box.

The method provided in this embodiment of this application is applicable to each combiner box. A controller of a single combiner box needs to implement control over a corresponding combiner box. The photovoltaic power generation system may include a voltage detection circuit, and may collect an output voltage of the combiner box in real time.

S702: When the output voltage of the combiner box is greater than or equal to a first preset voltage and less than or equal to a second preset voltage, control the combiner box to output maximum power. The second preset voltage is greater than the first preset voltage. The maximum power is a sum of maximum power of all photovoltaic strings connected to the combiner box. To be specific, when the output voltage of the combiner box is within a voltage range formed by the first preset voltage and the second preset voltage, the output power of the combiner box always outputs the maximum power.

S703: When the output voltage of the combiner box is greater than the second preset voltage, control output power of the combiner box to decrease as the output voltage increases. To be specific, when the output voltage of the combiner box is greater than the second preset voltage, the output voltage of the combiner box presents a monotonically droop characteristic.

In a possible implementation, the first preset voltage is greater than or equal to a maximum value of voltages corresponding to maximum power points of all the photovoltaic strings connected to the combiner box, and the second preset voltage is greater than or equal to a direct current bus voltage of the inverter.

The first preset voltage is greater than or equal to the maximum value of the voltages corresponding to the maximum power points of all the photovoltaic strings connected to the combiner box. To be specific, the first preset voltage is no less than the maximum value of the voltages corresponding to the maximum power points of all the photovoltaic strings connected to the combiner box. For example, if the combiner box is connected to four photovoltaic strings, the first preset voltage is greater than or equal to a maximum value of voltages corresponding to maximum power points of the four photovoltaic strings, that is, greater than or equal to a maximum value of four voltages.

The second preset voltage is greater than or equal to a minimum direct current voltage of the inverter in a linear modulation area, that is, greater than a direct current bus voltage required by the inverter, that is, a peak line voltage of an alternating current output end of the inverter. When the inverter works, there is a requirement for the direct current bus voltage. Therefore, the second preset voltage may be set based on the direct current bus voltage sent by the inverter.

According to the photovoltaic power generation system provided in this embodiment of this application, the combiner box is virtualized as a photovoltaic source, so that the combiner box has a PV curve similar to the photovoltaic string, and control over the output power is implemented based on the PV curve without depending on a power limiting instruction of the inverter. Therefore, the combiner box can independently implement control over the output power of the combiner box without being affected by a communication speed between the inverter and the combiner box.

This is not specifically limited in this embodiment of this application. When the output voltage of the combiner box is greater than the second preset voltage, a specific control manner of the output power of the combiner box is that the output power of the combiner box decreases as the output voltage of the combiner box increases, and may decrease proportionally or may not decrease proportionally. This is not specifically limited in this embodiment of this application.

In a possible implementation, that the controller of the combiner box controls the output power of the combiner box to decrease as the output voltage increases specifically includes: controlling, based on the output voltage of the combiner box, an open-circuit voltage of the combiner box, and the second preset voltage, the output power of the combiner box to decrease as the output voltage increases, where the open-circuit voltage of the combiner box is greater than a maximum value of open-circuit voltages of all the photovoltaic strings connected to the combiner box.

When the output voltage of the combiner box is greater than the second preset voltage, the controller may specifically control, according to the following formula based on the output voltage of the combiner box, the open circuit voltage of the combiner box, and the second preset voltage, the output power $P_{out}$ of the combiner box to decrease as the output voltage increases:

$$P_{out} = P_{outmax}\left[1 - \frac{(u_{out} - U_{mppt2})^2}{(U_{oc} - U_{mppt2})^2}\right]$$

$P_{outmax}$ is the maximum power; $u_{out}$ is the output voltage of the combiner box; $U_{mppt2}$ is the second preset voltage; and $U_{oc}$ is the open-circuit voltage of the combiner box.

The power control method provided in this embodiment of this application may further include: adjusting an output voltage of a corresponding photovoltaic string to adjust the output power of the combiner box. To be specific, the controller of the combiner box may adjust the output power of the combiner box by adjusting an output voltage of a photovoltaic string connected to an input end of the combiner box. Because the output voltage and an output current of the photovoltaic string have a characteristic relationship of a current-voltage curve, the controller of the combiner box may also change the output power by adjusting an input current of the combiner box.

All content described in the foregoing photovoltaic power generation system embodiment is applicable to the power control method described in this embodiment, and repeated parts are not described herein again.

Combiner Box Embodiment

Based on the photovoltaic power generation system and the power control method that are provided in the foregoing embodiments, an embodiment of this application further provides a combiner box. The following provides detailed description with reference to the accompanying drawings.

Figure 8:
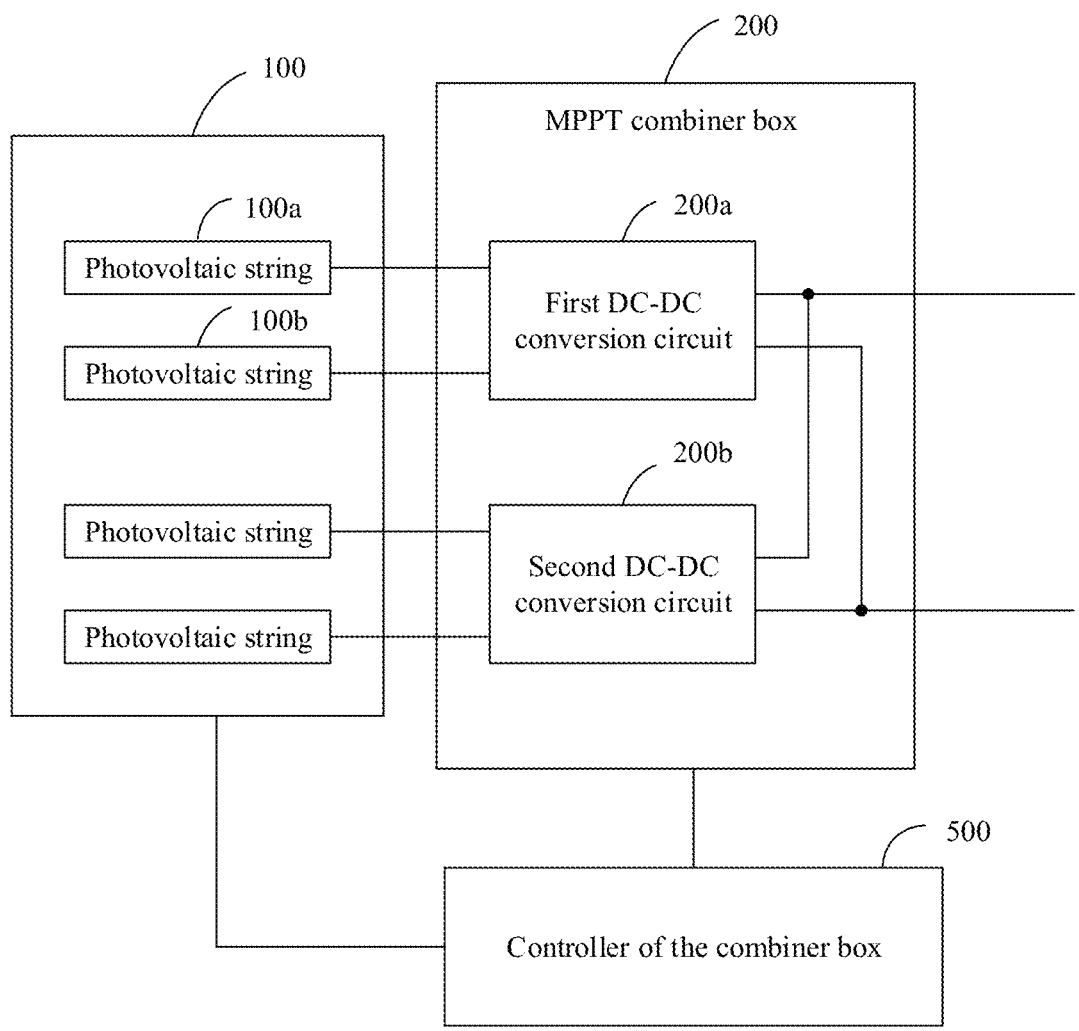
FIG. 8 is a schematic diagram of a combiner box according to an embodiment of this application.

FIG. 8 is a schematic diagram of a combiner box according to an embodiment of this application.

The combiner box provided in this embodiment of this application may be the combiner box in any one of the foregoing embodiments, and includes a plurality of DC-DC circuits and a controller 500 of the combiner box.

An input end of each DC-DC circuit is connected to a corresponding photovoltaic string.

Output ends of the plurality of DC-DC circuits are connected in parallel and are configured to connect to an input end of an inverter.

The controller 500 of the combiner box is configured to: when an output voltage of the combiner box is greater than or equal to a first preset voltage and less than or equal to a second preset voltage, control the combiner box to output maximum power, where the maximum power is a sum of maximum power of all photovoltaic strings connected to the combiner box, the second preset voltage is greater than the first preset voltage; and when the output voltage of the combiner box is greater than the second preset voltage, control output power of the combiner box to decrease as the output voltage increases.

It should be noted that the combiner box provided in this embodiment of this application is applicable to any combiner box. If the input end of the inverter is connected to a plurality of combiner boxes, each combiner box may implement control over output power of the combiner box in the foregoing control manner. When the input end of the inverter is connected to a plurality of combiner boxes, a maximum power point can be tracked provided that virtual PV curves of the plurality of combiner boxes have a common range.

In this embodiment of this application, a quantity of photovoltaic strings connected to an input end of the combiner box is not limited, and may be set based on a power requirement. A plurality of photovoltaic strings are connected in parallel to the input end of the combiner box.

The output power of the combiner box provided in this embodiment of this application presents a characteristic similar to a PV curve of the photovoltaic string. To be specific, when the output voltage of the combiner box is greater than the second preset voltage, the output power of the combiner box presents a decreasing trend as the output voltage of the combiner box increases. The controller of the combiner box may independently adjust the output power of the combiner box based on the characteristic of the PV curve, without depending on a power limiting instruction sent by an inverter side, therefore without depending on high-speed communication between the inverter and the combiner box. Even if a communication speed between the inverter and the combiner box is relatively low, control over the output power of the combiner box by the combiner box is not affected. For the inverter, the inverter may implement power scheduling quickly in a power control manner of a single-stage power conversion system. To be specific, when the combiner box is considered as a PV source, a two-stage photovoltaic power generation system may be equivalent to a single-stage photovoltaic power generation system, and control is implemented in a power scheduling manner of the single-stage photovoltaic power generation system.

The first preset voltage is greater than or equal to a maximum value of voltages corresponding to maximum power points of all the photovoltaic strings connected to the combiner box. For example, if N photovoltaic strings correspond to voltages at N maximum power points, a maximum value of the N voltages is used. N is generally an integer greater than or equal to 2. The second preset voltage is greater than or equal to a minimum direct current voltage of the inverter in a linear modulation area, that is, greater than a direct current bus voltage required by the inverter, that is, a peak line voltage of an alternating current output end of the inverter. When the inverter works, there is generally a requirement on the direct current bus voltage. For example, if an output end of the inverter is connected to an alternating current power grid, the direct current bus voltage of the inverter is set based on a valid value of a voltage of the alternating current power grid, and needs to be greater than a valid value of a line voltage of the alternating current power grid.

The controller 500 of the combiner box is specifically configured to control, based on the output voltage of the combiner box, an open-circuit voltage of the combiner box, and the second preset voltage, the output power of the combiner box to decrease as the output voltage increases, where the open-circuit voltage of the combiner box is greater than a maximum value of open-circuit voltages of all the photovoltaic strings connected to the combiner box.

All content described in the foregoing photovoltaic power generation system embodiment is applicable to the combiner box described in this embodiment, and repeated parts are not described herein again.

The combiner box provided in this embodiment of this application may be virtualized as a photovoltaic PV source, so that the output voltage and the output power of the combiner box have the characteristic similar to the PV curve of the photovoltaic string, that is, a droop characteristic. When the output voltage is within a range, the output power is the maximum power, that is, a fixed maximum output power. When the output voltage is greater than the range, the output power decreases as the output voltage increases, that is, the output power presents the droop characteristic. The combiner box independently implements control over the output power of the combiner box without depending on a control instruction of the inverter, therefore without depending on high-speed communication between the inverter and the combiner box. Even if the communication speed between the inverter and the combiner box is relatively low, control over the output power of the combiner box by the combiner box is not affected. Control over the inverter on output power of the inverter may be directly implemented based on a single-stage power conversion system, that is, the inverter may directly consider the combiner box as a photovoltaic input source. The inverter can control an output current of the inverter to control the output power of the inverter.

It should be understood that in this application, "at least one (item)" refers to one or more and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. A character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A photovoltaic power generation system, comprising:
    an inverter;
    at least one combiner box, comprising a plurality of direct current-direct current (DC-DC) circuits and one controller;
    wherein output ends of the plurality of DC-DC circuits in the at least one combiner box are connected in parallel to an input end of the inverter;
    wherein an input end of each of the plurality of DC-DC circuits is connected to a corresponding photovoltaic string; and
    wherein the controller of the combiner box is configured to:
        when an output voltage of the combiner box is greater than or equal to a first preset voltage and less than or equal to a second preset voltage, control the combiner box to output a maximum power; and
        when the output voltage of the combiner box is greater than the second preset voltage, control an output power of the combiner box to decrease as the output voltage of the combiner box increases, wherein the output power of the combiner box is determined based at least on a difference between the output voltage of the combiner box and the second preset voltage,
    wherein the second preset voltage is greater than the first preset voltage, and the maximum power is a sum of maximum powers of all photovoltaic strings connected to the combiner box.

2. The photovoltaic power generation system according to claim 1, wherein:
    the first preset voltage is greater than or equal to a maximum value of voltages corresponding to maximum power points of all the photovoltaic strings connected to the combiner box; and
    the second preset voltage is greater than or equal to a minimum direct current voltage corresponding to a case in which the inverter is in a linear modulation area.

3. The photovoltaic power generation system according to claim 2, wherein the controller of the combiner box is configured to:
    control, based on the output voltage of the combiner box, an open-circuit voltage of the combiner box, and the second preset voltage, the output power of the combiner box to decrease as the output voltage increases, wherein the open-circuit voltage of the combiner box is greater than a maximum value of open-circuit voltages of all the photovoltaic strings connected to the combiner box.

4. The photovoltaic power generation system according to claim 3, wherein the controller of the combiner box is configured to:
    control, according to the following formula, the output power of the combiner box to decrease as the output voltage increases:

$$P_{outmax}\left[1 - \frac{(u_{out} - U_{mppt2})^2}{(U_{oc} - U_{mppt2})^2}\right]$$

wherein $P_{outmax}$ is the maximum power, $u_{out}$ is the output voltage of the combiner box, $U_{mppt2}$ is the second preset voltage, and $U_{oc}$ is the open-circuit voltage of the combiner box.

5. The photovoltaic power generation system according to claim 1, wherein:
    the combiner box comprises the following: a first combiner box and a second combiner box; and
    a second preset voltage of the first combiner box is greater than a first preset voltage of the second combiner box, and a second preset voltage of the second combiner box is greater than a first preset voltage of the first combiner box.

6. The photovoltaic power generation system according to claim 5, wherein the controller of the combiner box is configured to adjust an output voltage corresponding to a photovoltaic string to adjust the output power of the combiner box.

7. The photovoltaic power generation system according to claim 6, further comprising an inverter controller, wherein the inverter controller is configured to control an output power of the inverter based on a power limiting instruction value.

8. A power control method for a photovoltaic power generation system, wherein the photovoltaic power generation system comprises an inverter and at least one combiner box, the combiner box comprises a plurality of direct current-direct current (DC-DC) circuits and one controller, output ends of the plurality of DC-DC circuits in the combiner box are connected in parallel to an input end of the inverter, and an input end of each DC-DC circuit is connected to a corresponding photovoltaic string, the power control method comprising:
when an output voltage of the combiner box is greater than or equal to a first preset voltage and less than or equal to a second preset voltage, controlling the combiner box to output a maximum power; and
when the output voltage of the combiner box is greater than the second preset voltage, controlling an output power of the combiner box to decrease as the output voltage of the combiner box increases, wherein the output power of the combiner box is determined based at least on a difference between the output voltage of the combiner box and the second preset voltage,
wherein the second preset voltage is greater than the first preset voltage, and the maximum power is a sum of maximum powers of all photovoltaic strings connected to the combiner box.

9. The power control method according to claim 8, wherein:
the first preset voltage is greater than or equal to a maximum value of voltages corresponding to maximum power points of all the photovoltaic strings connected to the combiner box; and
the second preset voltage is greater than or equal to a minimum direct current voltage corresponding to a case in which the inverter is in a linear modulation area.

10. The power control method according to claim 9, wherein the controlling an output power of the combiner box to decrease as the output voltage increases comprises:
controlling, based on the output voltage of the combiner box, an open-circuit voltage of the combiner box, and the second preset voltage, the output power of the combiner box to decrease as the output voltage increases, wherein the open-circuit voltage of the combiner box is greater than a maximum value of open-circuit voltages of all the photovoltaic strings connected to the combiner box.

11. The power control method according to claim 10, wherein the output power of the combiner box is controlled according to the following formula to decrease as the output voltage increases:

$$P_{outmax}\left[1 - \frac{(u_{out} - U_{mppt2})^2}{(U_{oc} - U_{mppt2})^2}\right]$$

wherein $P_{outmax}$ is the maximum power, $u_{out}$ is the output voltage of the combiner box, $U_{mppt2}$ is the second preset voltage, and $U_{oc}$ is the open-circuit voltage of the combiner box.

12. The power control method according to claim 11, further comprising:
adjusting an output voltage of a corresponding photovoltaic string to adjust the output power of the combiner box.

13. The power control method according to claim 8, wherein:
the combiner box comprises the following: a first combiner box and a second combiner box; and
a second preset voltage of the first combiner box is greater than a first preset voltage of the second combiner box, and a second preset voltage of the second combiner box is greater than a first preset voltage of the first combiner box.

14. The power control method according to claim 8, comprising:
controlling an output power of the inverter based on a power limiting instruction value.

15. A combiner box, comprising a plurality of direct current-direct current (DC-DC) circuits and a controller of the combiner box, wherein:
an input end of each of the plurality of DC-DC circuits is connected to a corresponding photovoltaic string;
output ends of the plurality of DC-DC circuits are connected in parallel and are configured to connect to an input end of an inverter; and
the controller of the combiner box is configured to:
when an output voltage of the combiner box is greater than or equal to a first preset voltage and less than or equal to a second preset voltage, control the combiner box to output a maximum power, wherein the maximum power is a sum of maximum powers of all photovoltaic strings connected to the combiner box, the second preset voltage is greater than the first preset voltage; and
when the output voltage of the combiner box is greater than the second preset voltage, control an output power of the combiner box to decrease as the output voltage of the combiner box increases, wherein the output power of the combiner box is determined based at least on a difference between the output voltage of the combiner box and the second preset voltage.

16. The combiner box according to claim 15, wherein:
the first preset voltage is greater than or equal to a maximum value of voltages corresponding to maximum power points of all the photovoltaic strings connected to the combiner box; and the second preset voltage is greater than or equal to a minimum direct current voltage corresponding to a case in which the inverter is in a linear modulation area.

17. The combiner box according to claim 16, wherein the controller of the combiner box is configured to:
control, based on the output voltage of the combiner box, an open-circuit voltage of the combiner box, and the second preset voltage, the output power of the combiner box to decrease as the output voltage increases, wherein the open-circuit voltage of the combiner box is greater than a maximum value of open-circuit voltages of all photovoltaic strings connected to the combiner box.

18. The combiner box according to claim 17, wherein the controller of the combiner box is configured to:
control, according to the following formula, the output power of the combiner box to decrease as the output voltage increases:

$$P_{outmax}\left[1 - \frac{(u_{out} - U_{mppt2})^2}{(U_{oc} - U_{mppt2})^2}\right]$$

wherein $P_{outmax}$ is the maximum power, $u_{out}$ is the output voltage of the combiner box, $U_{mppt2}$ is the second preset voltage, and $U_{oc}$ is the open-circuit voltage of the combiner box.

19. The combiner box according to claim 15, wherein:
the combiner box comprises the following: a first combiner box and a second combiner box; and
a second preset voltage of the first combiner box is greater than a first preset voltage of the second combiner box, and a second preset voltage of the second combiner box is greater than a first preset voltage of the first combiner box.

20. The combiner box according to claim 15, wherein the controller of the combiner box is configured to adjust an output voltage corresponding to a photovoltaic string to adjust the output power of the combiner box.

* * * * *